F. G. LILJENROTH.
MEANS FOR REGULATING THE SPEED OF ELECTRIC MOTORS.
APPLICATION FILED DEC. 21, 1914.
1,165,788.  Patented Dec. 28, 1915.
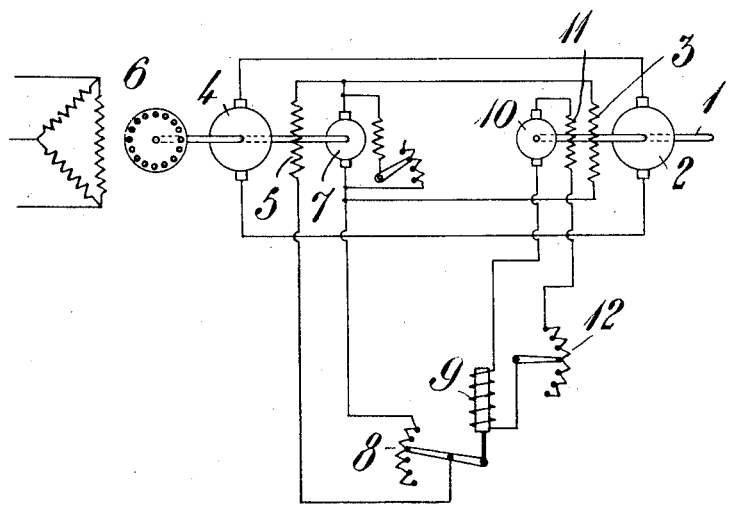

UNITED STATES PATENT OFFICE.

FRANS G. LILJENROTH, OF VESTERÅS, SWEDEN.

MEANS FOR REGULATING THE SPEED OF ELECTRIC MOTORS.

1,165,788.  Specification of Letters Patent.  Patented Dec. 28, 1915.

Application filed December 21, 1914. Serial No. 878,380.

*To all whom it may concern:*

Be it known that I, FRANS G. LILJENROTH, a citizen of the Kingdom of Sweden, residing at Vesterås, Sweden, have invented new and useful Improved Means for Regulating the Speed of Electric Motors, of which the following is a specification.

This invention relates to means for controlling the speed of electric motors having automatic regulators.

In certain machines, as for instance, paper-making machines, which are driven by electric motors it is desirable, on the one hand, that the number of revolutions can be varied within wide limits, and on the other hand, that the number of revolutions, for which the motor has been adjusted, keeps itself, as far as possible, constant, independently of variations of the load of the working machine or the driving motor. For this purpose the following arrangement has heretofore been employed. To the shaft the speed of which is to be controlled, is coupled a small continuous current generator supplying current to the coil of a usual automatic regulator (such as a Thury, Tirill or other regulator). This regulator acts upon the driving motor in any suitable manner so as to keep the number of revolutions constant.

The present invention relates to an improvement of said well-known arrangement for the purpose of obtaining a more perfect speed regulation and consists in certain novel arrangements and combinations which shall be more fully described in the following by referring to the accompanying drawing which shows diagrammatically a constructional form of the present invention.

Referring to the drawing 1 designates the driven shaft, the speed of which is to be regulated, and which is driven by a separately excited continuous current motor. 2 is the armature of the said driving motor and 3 is the field winding thereof. The driving motor 2 is supplied with current from a continuous current generator 4 the field winding 5 of which is excited separately. The generator 4 is driven by a polyphase alternating current motor 6 which may be an asynchronous or a synchronous motor. The motor 2 as well as the generator 4 are supplied with exciting current from an exciter 7 the armature of which is mechanically coupled to the generator 4. The excitation of the motor 2 is constant, but that of the generator 4 may be varied by means of a resistance 8 acted upon by the automatic regulator 9, the coil of which is supplied with current from a generator 10 mechanically connected to the motor 2. The field winding 11 of this generator is connected in series with its armature and the winding of the regulator 9. The number of revolutions of the motor 2 may be varied by means of the manually operated resistance 12 included in the circuit of the regulator coil 9.

The operation of this arrangement may be explained as follows: As soon as the current of the regulating coil 9 for the one reason or the other deviates from the value corresponding to the momentary state of equilibrium, *i. e.* is increased or reduced, the resistance 8 varies accordingly. This will result, firstly, in that the tension of the generator 4 and thus the speed of the motor 2 and the shaft 1 as well as the tension of the auxiliary machine 10 is reduced or increased. This reduction or increase will continue, until the state of equilibrium is restored, that is, until the current of the regulating coil has again reached its correct value. The automatic regulator 9 thus regulates the intensity of its own current on a constant value, and as the field winding 11 is connected in series to the regulating coil 9, the regulator will apparently also keep the intensity of current of the winding 11 constant. The possibility of obtaining such an effect depends on that a small change of the speed of the shaft 1 will cause a comparatively much greater variation of the current supplied by the series machine 10 so that the regulator supplied by the said current can work until the speed change that has occurred is again substantially equalized.

Having thus described the invention, what I claim as new and desire to secure by Letters Patent, is:—

In combination, a separately excited continuous current generator, a continuous current motor supplied by said generator, an automatic electric regulator controlling the excitation of said generator, and an auxiliary generator mechanically coupled to said motor and supplying the coil of the automatic regulator, said auxiliary generator being provided with series excitation, substantially as and for the purpose set forth.

In testimony that I claim the foregoing as my invention, I have signed my name in presence of two subscribing witnesses.

FRANS G. LILJENROTH.

Witnesses:
 JOHN DELMAS,
 K. E. WIBERG.